Figure 1:
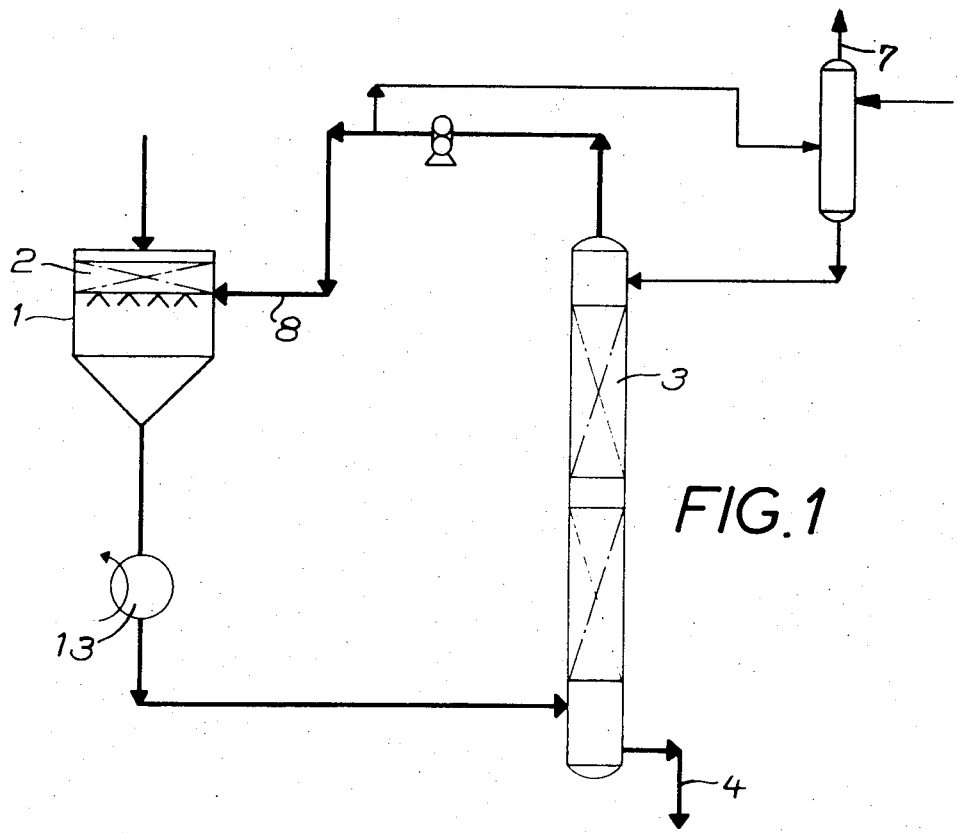

United States Patent [19]

Maux

[11] 3,728,398

[45] Apr. 17, 1973

[54] PREPARATION OF FORMALDEHYDE

[75] Inventor: Raymond Maux, Bully-les-Mines, France

[73] Assignee: Societe Chimique des Charbonnages, Paris, France

[22] Filed: Mar. 17, 1970

[21] Appl. No.: 20,256

[30] Foreign Application Priority Data

Mar. 20, 1969 France..................................6908178

[52] U.S. Cl............................260/603 HF, 23/288 R
[51] Int. Cl.................................................C07c 45/16
[58] Field of Search........................260/603 HF, 606, 260/687, 524 R, 451

[56] References Cited

FOREIGN PATENTS OR APPLICATIONS 1,259,323    1/1958    Germany.......................260/603 HF Primary Examiner—Leon Zitver
Assistant Examiner—R. H. Liles
Attorney—Saul Jecies

[57] ABSTRACT

This invention relates to an improved process for the preparation of formaldehyde by oxidising methanol by air in the presence of a silver catalyst and is characterised in that the gases leaving the installation after separation of the condensable products, viz. water, methanol and formaldehyde, are at least partly reinjected in the cold state into the gaseous mixture leaving the catalyst layer.

4 Claims, 3 Drawing Figures

Inventor
Raymond Maux

By [signature]

His Attorney

PREPARATION OF FORMALDEHYDE

The present invention relates to the preparation of formaldehyde by the known process of oxidising methanol by air in the presence of a silver catalyst.

In this known preparation, a gaseous mixture of methanol and air is passed at a suitable temperature over a silver catalyst. The reaction products leave the catalyst layer at a temperature between approximately 500°C and 650°C. These gases also contain the methanol which has not reacted, as well as the desired formaldehyde, water, nitorgen, carbon monoxide, carbon dioxide and hydrogen. It was proved nitrogen, long time ago that in such a gaseous mixture, the temperature of which is between approximately 500°C and 600°C, a certain number of chemical reactions are liable to develop which are considered as parasitic with respect to the main formation reaction of the formaldehyde and which it is generally desired to minimise or suppress. To this end, various methods have been advocated which can be summed up more particularly in the use of an indirect heat exchanger and in the use of atomization of water or a diluted solution of formol. Naturally, it was the aim of the various known methods to lower the temperature of the gases leaving the catalyst layer as quickly as possible to a value lower than 350° C - 450°C. These methods of treating hot gases have various drawbacks and it is an object of the invention to avoid or minimise these drawbacks as far as possible.

According to the present invention, a method of preparing formaldehyde by oxidising methanol by air in the presence of a silver catalyst is characterised in that the gases leaving the plant after separation from the condensable products (water, methanol and formaldehyde) ARE AT LEAST partly reinjected in the cold state into the gaseous mixture leaving the catalyst layer.

The reinjected gases contain, more particularly, nitrogen, carbon dioxide, carbon monoxide and hydrogen. These gases are referred to as "tail" gases, and are cold, since they are obtained after treating the gaseous mixture leaving the catalyst layer by known methods having as an object, the condensation or absorption of the condensable chemical products contained in this gaseous mixture. They are, on the other hand, only of small value and are usually rejected to atmosphere. However, used according to the invention, they allow the yield from a plant for preparing the formaldehyde to be substantially improved.

This improvement in the yield is carried out following a complex mechanism which has not yet been entirely elucidated. It is caused certainly partly by the rapid cooling of the gaseous mixture leaving the catalyst layer, in which the synthesis of the formaldehyde is carried out: for this reason, it will be apparent that the reinjection of the tail gases must be effected as near as possible to the last layer of the catalyst bed and that it must be ensured, if maximum improvement is to be obtained, that a good distribution of the gases injected into the gaseous mixture leaving the catalyst is effected.

But it is also certain that the improvement of yield is caused partly by the composition of the said tail gas. In order to obtain maximum improvement of yield, it has been found, on the other hand, that it was necessary to inject a quantity of tail gas into the gaseous mixture leaving the catalyst layer, representing per molecule of formol (formaldehyde) prepared approximately 1.7 times the quantity of tail gases produced. This is why, according to the invention, such a quantity of tail gas will be made to circulate and be reinjected into the gaseous mixture and that the gaseous circuit will be cleared from the excess gases produced as the reaction takes place.

Amongst the other advantages of the method according to the invention may be mentioned:

1. The increase in the volume of inert gas resulting from the recirculation enables the evaporation of a large part of the water and methanol situated at the base of the first absorption tower, which is a particularly interesting advantage when urea-formaldehyde concentrates are to be produced by absorption by means of solutions of urea.

2. This same increase of the gaseous volume leaving the reactor facilitates thermal recuperation of the reaction heat by exchange, whilst avoiding premature condensation in the exchangers, on account of the partial decrease in pressure of the condensable part.

3. The invention can be adapted immediately to methods using a circuit operating at a pressure lower than atmospheric pressure throughout the line with synthesis of transport for the gases situated at the tail of the installation. Only the calibre of the compressor or ventilator used is to be increased.

Figure 3:
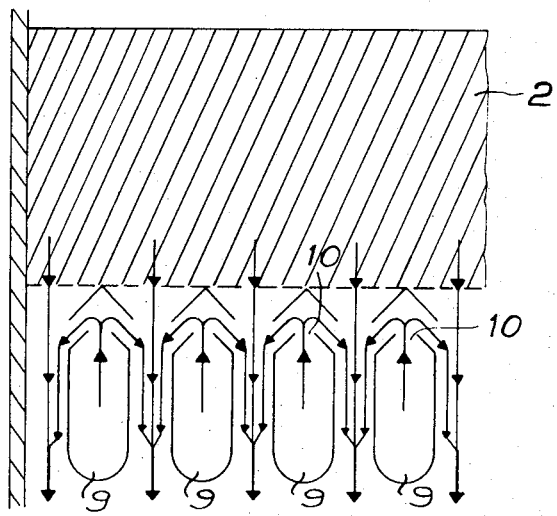
Figure 2:
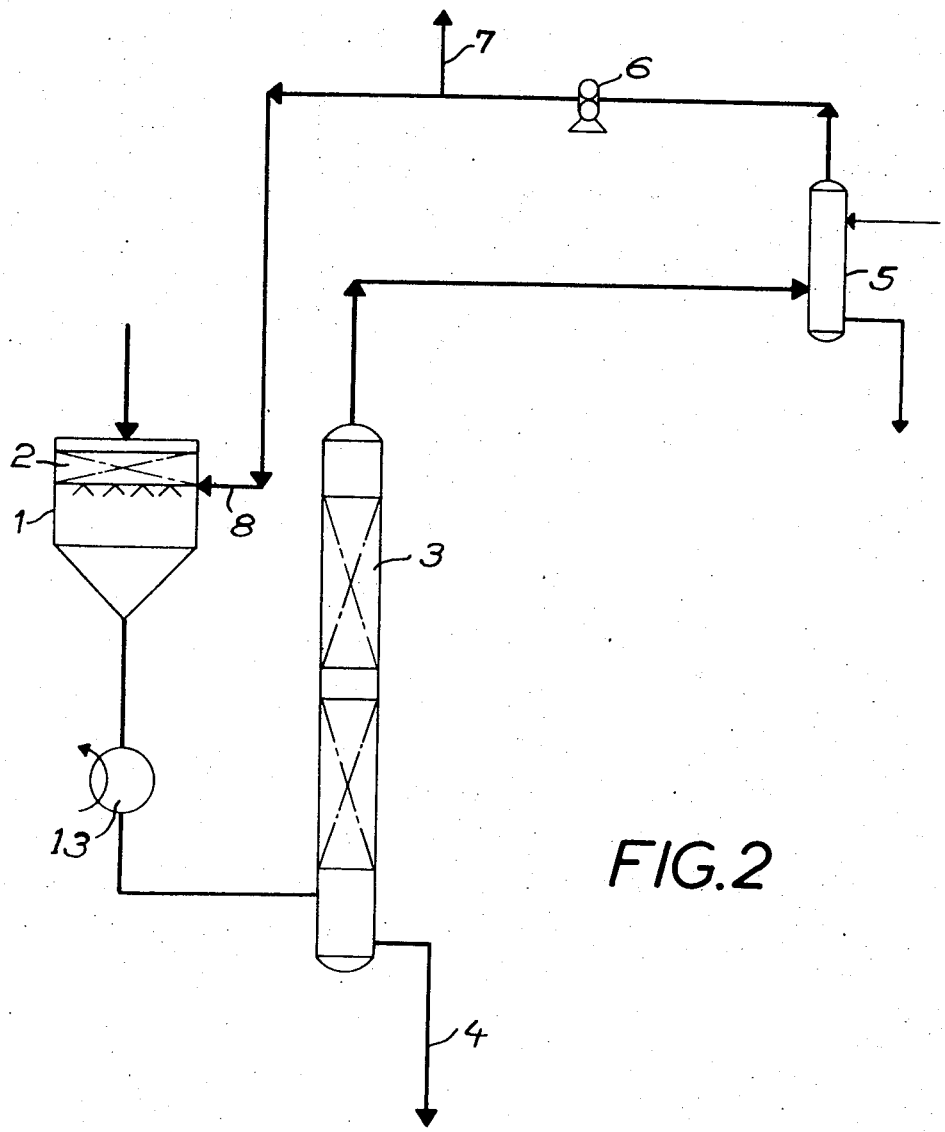

In order that the invention may be more clearly understood, reference will now be made to the accompanying drawings which show certain embodiments thereof, by way of example, and in which:

FIGS. 1 and 2 show diagrammatic representations of two installations for the preparation of formaldehyde according to the invention, and FIG. 3 shows an embodiment of a device for injecting the tail gas into the gaseous mixture leaving the catalyst layer.

Two installations for producing formaldehyde according to the invention are shown diagrammatically in FIGS. 1 and 2. A mixture containing between 95 and 114 g methanol per 100 litres of air is inserted into a reactor 1 which comprises a layer of silver catalyst 2. This reactor receives, moreover, through a conduit 8, adequate quantities of the tail gases hereinabove referred to. The gaseous mixture obtained is cooled in a heat exchanger 13, and then passes into an absorption system. In the installation shown in FIG. 1, this sytem is more particularly formed from a tower 3 through which water flows, with counterflow of the gases; at the base of the tower 3 an aqueous solution of methanol and formaldehyde is collected. This system is formed in the installation shown by FIG. 2 from a first absorption tower 3 through which flows a solution of urea, and at the foot of which a solution of urea-formaldehyde is collected and by an absorption tower 5 through which flows water, and at the foot of which a solution containing, inter alia, methanol is collected.

In each case, the cold gases leaving the absorption system are passed to a cleansing device indicated by 7, and to the reactor through the conduit 8.

In FIG. 3 is shown schematically a device for injecting the tail gas into the gaseous mixture leaving the catalyst layer 2 through which the reaction gases pass from top to bottom. The tail gas arrives in pipes 9, perpendicularly to the plane of the drawing and leaves through holes 10 formed in the upper part of the said pipes. This tail gas is therefore mixed rapidly and very thoroughly with the gaseous mixture leaving the catalyst.

I claim:

1. In a method of preparing formaldehyde, the steps of advancing gaseous methanol and air into contact with a silver catalyst for oxidizing of the methanol and subsequent issuance from the catalyst of a gaseous mixture including condensable products; cooling the issued mixture at a location downstream of said catalyst; separating the cooled issued mixture into the condensable products and residual cold gases; and injecting at least a portion of the cold gases into the issuing mixture upstream of said location and substantially at the point of issuance of the mixture from the catalyst so as to effect rapid initial cooling of the mixture.

2. In a method as defined in claim 1, wherein the step of injecting comprises introducing said cold residual gases into the issuing mixture immediately adjacent the catalyst.

3. In a method as defined in claim 1, wherein the step of injecting comprises introducing said cold residual gases into the issuing mixture in such a manner as to obtain rapid and thorough distribution therein.

4. In a method as defined in claim 1, wherein the quantity of residual cold gas injected into said mixture, per molecule of formaldehyde prepared, represents approximately 1.7 times the quantity of residual gas produced by the reaction in stiochiometrical quantity between the air and the methanol.

* * * * *